UNITED STATES PATENT OFFICE.

CLAY HARPOLD, OF CLEBURNE, TEXAS.

METHOD OF EXTERMINATING JOHNSON GRASS.

SPECIFICATION forming part of Letters Patent No. 678,468, dated July 16, 1901.

Application filed July 16, 1900. Serial No. 23,832. (No specimens.)

*To all whom it may concern:*

Be it known that I, CLAY HARPOLD, a citizen of the United States, residing at Cleburne, in the county of Johnson and State of Texas, have invented a new and useful Process for Exterminating Johnson Grass, of which the following is a specification.

The object of my invention is to exterminate the Johnson grass (*Sorghum halepense*) prevalent in many of the southern States, especially in the cotton-growing districts. This grass has been a great pest in the southern countries, and various methods have been tried to exterminate it. Numerous plowings and harrowings have been resorted to; but this method is only efficient when carried on with great labor and expense, which often exceeds the value of the land itself. Another method heretofore employed is to apply substances for poisoning the grass; but this also poisons the land and prevents crops being grown on the land for several years, besides being expensive.

The roots of Johnson grass vary from a few inches to three or four feet in length, with joints from one-half to two inches in length, and these roots are from one-fourth inch to one-half inch in diameter. Most of them are flat and crooked. The roots throw out shoots or sprouts from the joints and produce a large number of twine-roots from every joint. The grass appears in the early spring and grows slowly for about two months, then very rapidly for the next few weeks, during which time it multiplies rapidly both above and below the ground and continues to do so until midsummer or maturity, if the soil is dry. If the soil is wet, it multiplies much faster than formerly under ground till dry again. The roots often occupy one-half of the space near the surface of the ground, the area decreasing as the roots descend. The grass often grows to a height of nine or ten feet and is very thickly arranged on the surface of the ground. It will readily be understood from this description what a difficult grass I have to deal with and how desirable it is to get rid of it by a simple process.

I find that by stimulating the growth of the grass by shallow winter breaking and thorough harrowing as deep as the ground is broken and by systematic cultivation carried on in a particular way I can extract the vitality from the roots and cause them to decay prematurely, leaving behind no material for producing a second crop.

Broadly stated, my process consists in breaking the soil and pulverizing as deep as broken to admit air, light, and moisture and severing the grass from the roots at stated periods to cause the roots to produce repeated crops, and thus finally extracting all the vitality from the roots and exhausting them.

In carrying out my invention I break the ground during the winter—after the first killing frost and before the grass begins to grow in the spring. The ground is preferably at this time broken to a depth of three inches or less. The broken ground is then pulverized as deep as broken by harrowing, and when this is done no further cultivation is resorted to until time is given for the grass to grow vigorously to the height of one to three feet. After this—say about April 20—I break the ground again, this time taking care to turn out of sight the grass which has appeared during the interval between the first and second breaking and pulverizing of the soil. The broken ground is then pulverized as deep as broken, and this should occur some time after the second breaking—say a week. This gives time for the butts of grass to heat and decay. A week or ten days after the last harrowing I cultivate the ground as deep as mellow to prevent the twine-roots of the grass from tying themselves together in the ground and forming a sod and to keep the soil loose. I again cultivate the soil four to seven times— each time as deep as mellow—at intervals of a week to twenty days apart. I allow sufficient time between the several cultivatings to allow the grass to sprout and grow to some extent, and then destroy this growth by cultivation as deep as mellow.

The cultivations above described should be as deep as land is mellow, which at this stage of the process will be to a depth of from six to eight inches. Repeated cultivations cause the loose soil to be deeper than when begun at three inches in winter.

The deep cultivations referred to do not kill the grass, but rather stimulate for a time the growth of the grass, causing the vitality of the roots to be exhausted. If instead of cultivating deep I used shallow cultivations, a crust would be formed near the surface which would kill the grass, prevent the roots from sprouting, and thus keep the roots in a good state of preservation, and these would grow luxuriantly the next year.

The number of times that the soil is cultivated and the periods between the several cultivations may vary somewhat in different latitudes and different conditions of the soil.

I have described specifically a process which is found to be efficient in many localities; but in all cases it is necessary to break the ground in the winter, or before the grass begins to grow in the spring, and to pulverize this broken ground and then to allow the grass to grow for a comparatively long period, permitting it to attain a considerable height, then to break the ground, turning under the grass, allowing it to heat and decay, then to pulverize the soil as deep as broken, and thereafter at comparatively short intervals to cultivate the ground in the manner described above.

If the grass-infested land be otherwise suitable, cotton may be raised thereon without interfering with this method.

I claim as my invention—

The method of exterminating Johnson grass, which consists in first breaking the soil infested with the grass during the winter after the first killing frost and before the grass begins to grow in the spring; second, pulverizing the soil thus broken to stimulate the growth of grass by the admission of light, air and moisture; third, allowing the grass to grow undisturbed to a considerable height for a comparatively long period; fourth, breaking the soil and turning under the grass, fifth, allowing an interval for the grass thus turned under to heat and decay; sixth, pulverizing the soil as deep as broken; seventh, cultivating the soil as deep as mellow at frequent periods, and at suitable intervals apart to allow the grass to grow and to destroy these growths, thus finally exhausting the vitality of the roots and causing their decay.

In testimony whereof I have signed my name to this specification in the presence of two subscribing witnesses.

CLAY HARPOLD.

Witnesses:
J. R. POSEY,
W. C. GLASGOW.